CHARLES H. STRAFFIN.

Improvement in Clothes Line Reels.

No. 121,135.  Patented Nov. 21, 1871.

WITNESSES  INVENTOR 121,135

UNITED STATES PATENT OFFICE.

CHARLES H. STRAFFIN, OF BOSTON, MASSACHUSETTS.

IMPROVEMENT IN CLOTHES-LINE REELS.

Specification forming part of Letters Patent No. 121,135, dated November 21, 1871.

*To all whom it may concern:*

Be it known that I, CHARLES H. STRAFFIN, of Boston, in the county of Suffolk and State of Massachusetts, have invented a certain new and useful Clothes-Line Reel, of which the following is a specification:

The nature of my invention consists in a new construction of the supporting frame of the reel, said frame having attached at one of its ends a dovetail tenon, for the purpose of connecting it to a corresponding dovetail mortise made on or attached to the post or building. The opposite end of the frame is provided with a guide for the line as it passes onto or from the reel. The invention also consists in combining with the reel and frame a friction-plate to arrest the motion of the reel, so that when the line is being drawn out sufficient resistance will be offered to prevent any portion of it from dragging on the ground and thus become soiled. In ordinary reels this precaution has been overlooked, and it is difficult to draw out the line without having it sag so as to touch the ground.

Figure 1:
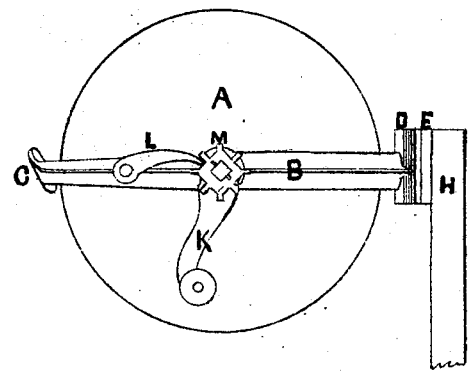
Figure 2:
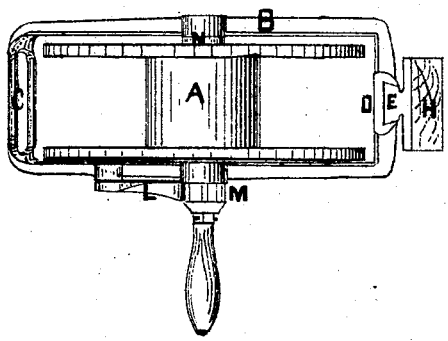
Figure 3:
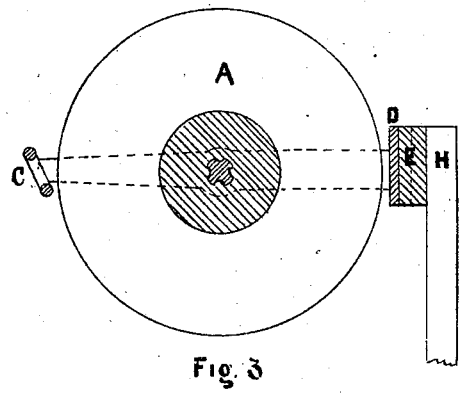

Figure 1 is an elevation of my invention. Fig. 2 is a plan of the same. Fig. 3 is a vertical section through the same.

Let H represent the standard to which my reel is to be attached. B is a frame made of cast-iron and of the form shown in the drawing. This frame has at one end a dovetail piece, D, which is made to fit into a corresponding piece, E, which is to be made fast to the support H. The end C of the frame B forms a guide for the line. The bobbin A is hung in the frame B, as shown, and is provided with a pawl and ratchet, M L, and crank K. N, Fig. 2, is a friction-plate, made of any suitable material, and serves to check the free revolution of the wheel while the line is being drawn out.

The advantage of the friction on the reel is, that considerable force will have to be exerted to draw out the line. Thus the line itself will be subjected to sufficient tension to keep it from sagging onto the ground and thus become soiled.

I claim as my invention—

The clothes-line reel when constructed as set forth, consisting of the frame B provided with the dovetail D and friction-plate N, and holding the bobbin A, substantially as described and for the purpose set forth.

CHARLES H. STRAFFIN.

Witnesses:
FRANK G. PARKER,
CHAS. J. BATEMAN.

(91)